United States Patent
Maruyama

(10) Patent No.: US 6,668,144 B2
(45) Date of Patent: Dec. 23, 2003

(54) IMAGE FORMING APPARATUS AND DETECTING DEVICE FOR DETECTING A TYPE OF RECORDING SHEET

(75) Inventor: Shoji Maruyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/004,810

(22) Filed: Dec. 7, 2001

(65) Prior Publication Data

US 2002/0071688 A1 Jun. 13, 2002

(30) Foreign Application Priority Data

Dec. 12, 2000 (JP) .................................. 2000-377223

(51) Int. Cl.[7] .............................................. G03G 15/00
(52) U.S. Cl. ........................................................ 399/45
(58) Field of Search .............................. 399/45, 66, 67, 399/68

(56) References Cited

U.S. PATENT DOCUMENTS

| | | | | |
|---|---|---|---|---|
| 5,512,992 A | * | 4/1996 | Kim et al. ................. | 399/45 X |
| 5,629,529 A | | 5/1997 | Motoyama ............. | 250/559.24 |
| 5,689,757 A | * | 11/1997 | Ferrante et al. ................ | 399/45 |
| 5,754,213 A | | 5/1998 | Whritenor .................... | 347/218 |
| 5,774,146 A | | 6/1998 | Mizutani ..................... | 347/43 |
| 5,831,744 A | * | 11/1998 | Kataoka .................... | 399/45 X |
| 6,088,547 A | * | 7/2000 | Martin et al. ................. | 399/45 |
| 6,163,662 A | * | 12/2000 | Martin et al. ................. | 399/45 |

FOREIGN PATENT DOCUMENTS

EP          0 743 785          11/1996

* cited by examiner

Primary Examiner—Fred L Braun
(74) Attorney, Agent, or Firm—Fitzpatrick, Cella, Harper & Scinto

(57) ABSTRACT

An image forming apparatus that detects a type of recording sheet and sets an image forming condition in accordance with the detected type of sheet includes a feeding unit that feeds a sheet, an image forming unit that forms an image on a sheet, and a reading unit that reads a picture of a surface of a sheet. A discriminating unit discriminates whether re-reading is necessary, on the basis of the picture. If so, another unit changes a reading condition of the reading unit and causes the reading unit to re-read the picture of the surface of the sheet. A detecting unit detects a type of sheet on the basis of the picture read by the reading unit, and a controlling unit controls an image forming condition on the basis of the result of the detection.

28 Claims, 5 Drawing Sheets

RECORDING SHEET A

RECORDING SHEET B

RECORDING SHEET C

RECORDING SHEET A

RECORDING SHEET B

RECORDING SHEET C

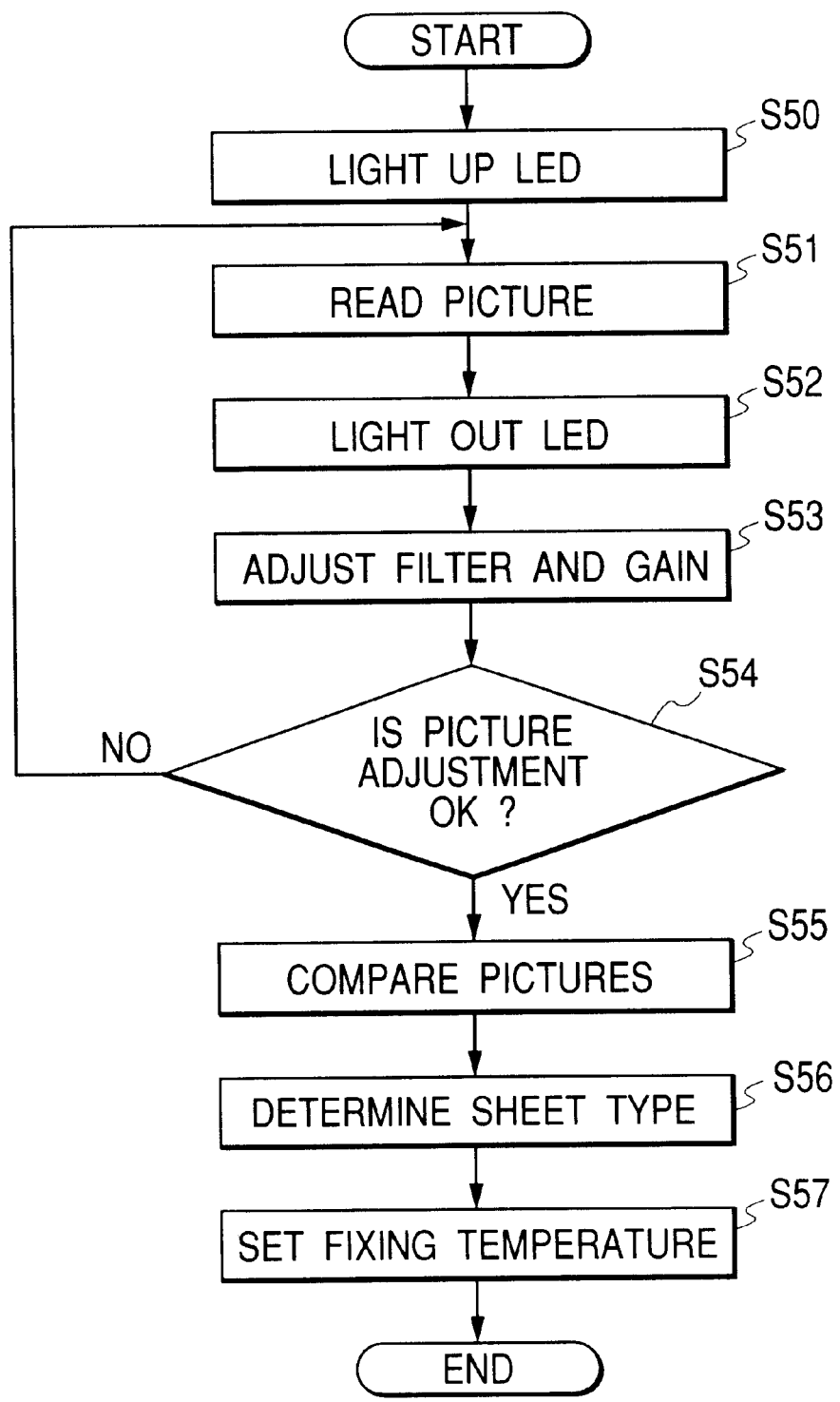

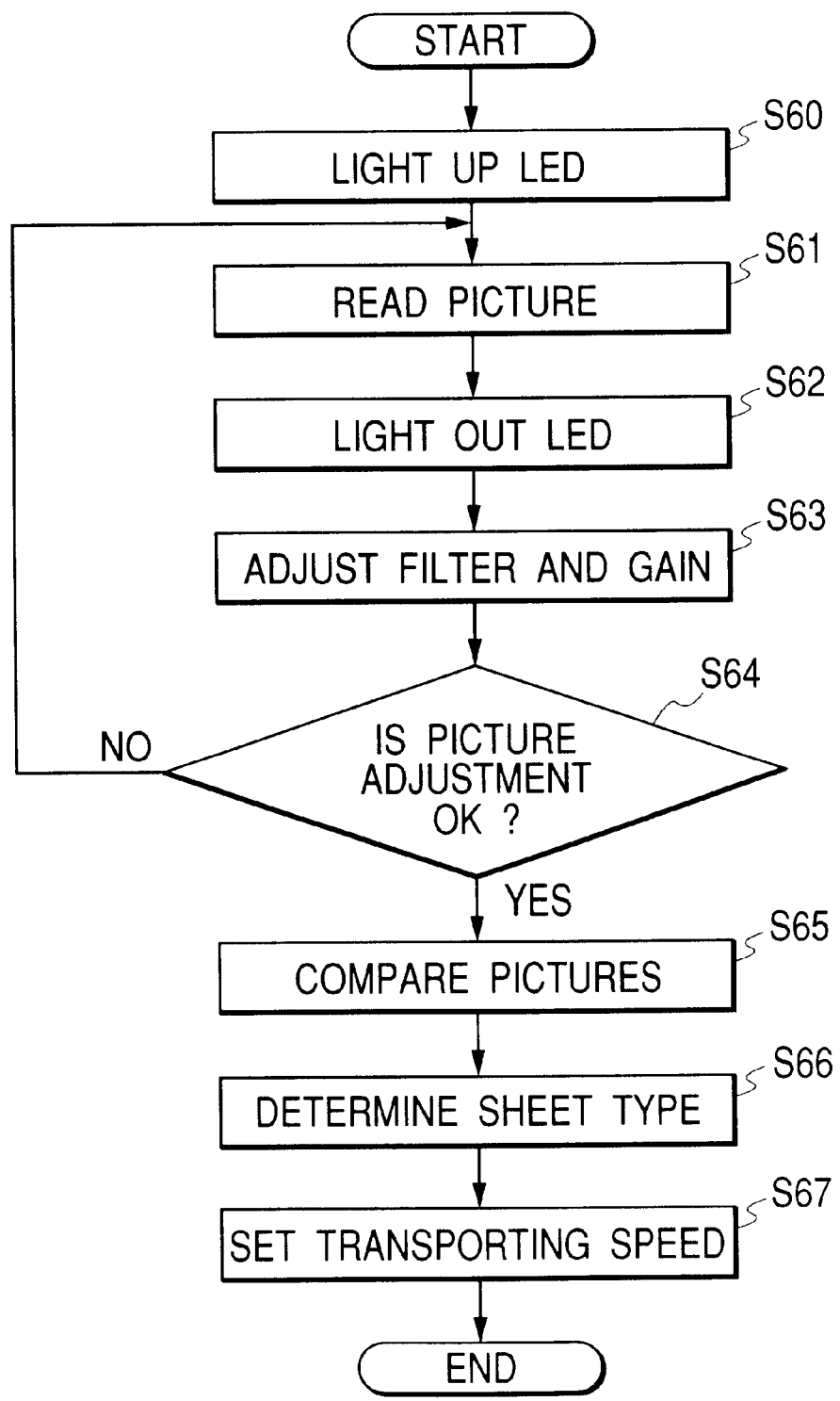

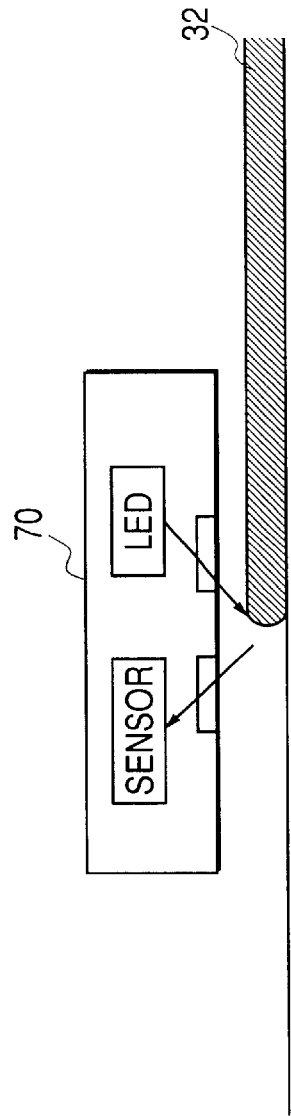
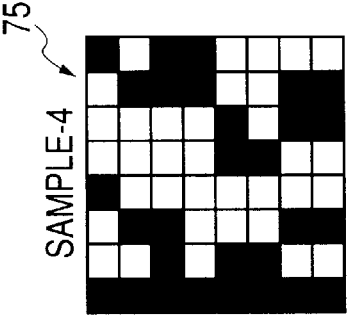
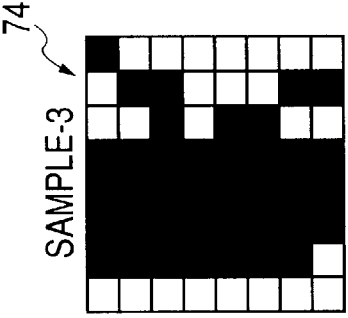
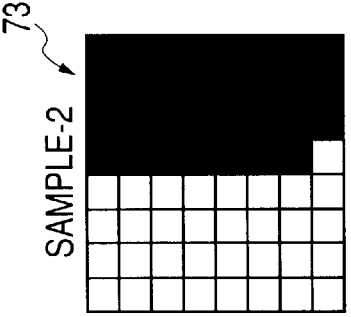
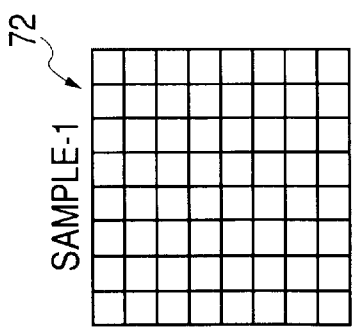

IMAGE FORMING APPARATUS AND DETECTING DEVICE FOR DETECTING A TYPE OF RECORDING SHEET

BACKGROUND OF THE INVENTION

1. Field of the Invention

The invention relates to an image forming apparatus such as a copier or a laser printer and further, a detecting device for detecting the type and thickness of a sheet.

2. Description of the Related Art

An image forming apparatus such as a copier or a laser printer is provided with a latent image bearing member for bearing a latent image thereon, a developing device for imparting a developer to the latent image bearing member to thereby visualize the latent image as a developed image, transferring means for transferring the developed image developed by the developing device to a recording material transported in a predetermined direction, and a fixing device for heating and pressurizing the recording material to which the developed image has been transferred by the transferring means under a predetermined fixing process condition to thereby fix the developed image on the recording material.

In such an image forming apparatus, for example, the size or type of a recording sheet which is used as a recording material (hereinafter referred to also as the sheet type) is set on an operating panel provided in the main body of the image forming apparatus by a user, and control is done so as to set a fixing process condition (for example, the fixing temperature or the transporting speed of the recording sheet passing the fixing device) in conformity with the setting.

Also, when the recording sheet is an OHT sheet, whether the recording sheet is an OHT sheet or not is automatically detected by a transmission sensor provided in the interior of the image forming apparatus, and if light is transmitted through the recording sheet, it is judged to be an OHT sheet, and if light is not transmitted through the recording sheet, it is judged to be plain paper, and control is done so as to set the fixing temperature or the transporting speed of the recording sheet in conformity with the result of the judgement.

However, the above-described conventional image forming apparatus has suffered from the following problems:

(1) It is necessary for the user to effect the setting of the sheet type in the image forming apparatus or PC and therefore, the image forming apparatus is inferior in its operability. Particularly, the user's load is great and the usability of the apparatus is bad.

(2) In recent years, the number of sheet types handled has become great and the set performed in advance cannot cover all sheet types. As the a result, the setting of the fixing process condition is not determined well and the fixing property becomes bad. Particularly, in the case of rough paper of which the surface paper fiber is asperate, the fixing becomes bad unless the toner on the recording sheet is sufficiently fusion-bonded.

(3) For example, by recording sheets being left stacked for a long time or left in the atmosphere for a long time, the surface roughness or the state of the surface paper fiber of the recording sheets may be changed. In such case, even if the sheet type is set by the set mode and the fixing process condition is set, it does not always coincide with the condition of recording sheets actually used and the fixing becomes bad.

(4) When the fixing process is effected on a recording sheet of such a type that the surface paper fiber of the recording sheet has been compressed with the fixing temperature set to a high level, the fusion bond of the toner occurs more than necessary and the gloss becomes higher than necessary and the quality of image becomes lower and besides, the electric power of the fixing device is consumed more than necessary, and this is not economical.

(5) The transmission sensor for the automatic detection of OHT sheets cannot judge the other sheet types and becomes a sensor exclusively for OHT, and the cost performance of the system total cost of the apparatus is bad.

(6) There are various methods of detecting the type of a recording sheet such as thick paper, but in both of (i) a method using, for example, a reflection sensor and (ii) a method of mechanically detecting the thickness of paper, a sensor exclusively for detecting the thickness of paper becomes necessary, and the cost performance of the system total cost of the image forming apparatus is bad.

SUMMARY OF THE INVENTION

So, it is an object of the present invention to provide an image forming apparatus which achieves improvements in usability and cost performance and yet can effect the fixing process for recording materials of various types under an optimum fixing process condition to thereby obtain good fixed images.

It is another object of the present invention to provide an image forming apparatus comprising:

feeding means for feeding a sheet;

image forming means for forming an image on the sheet fed by the feeding means;

recording means for reading a picture of the surface of the sheet fed by the feeding means;

discriminating means for discriminating whether rereading is necessary, on the basis of the picture read by the reading means;

means for changing the reading condition of the reading means and causing the picture of the edge portion of the sheet to be read again, on the basis of the fact that it has been discriminated by the discriminating means that rereading is necessary;

detecting means for detecting the type of the sheet on the basis of the picture read by the reading means; and control means for controlling the image forming condition of the image forming means on the basis of the result of the detection by the detecting means.

It is another object of the present invention to provide a detecting device comprising:

reading means for reading a picture of the surface of a fed sheet;

discriminating means for discriminating whether rereading is necessary, on the basis of the picture read by the reading means;

means for changing the reading condition of the reading means and causing the picture of the edge portion of the sheet to be read again, on the basis of the fact that it has been discriminated by the discriminating means that rereading is necessary; and detecting means for detecting the type of the sheet on the basis of the picture read by the reading means.

It is another object of the present invention to provide an image forming apparatus comprising:

feeding means for feeding a sheet;

image forming means for forming an image on the sheet fed by the feeding means;

reading means for reading a picture of the edge portion of the sheet fed by the feeding means;

detecting means for detecting the thickness of the sheet on the basis of the picture read by the reading means; and control means for controlling the image forming condition of the image forming means on the basis of the result of the detection.

It is another object of the present invention to provide a detecting device comprising:

reading means for reading a picture of the edge portion of a fed sheet; and detecting means for detecting the thickness of the sheet on the basis of the picture read by the reading means.

Other objects, constructions and effects of the present invention will become apparent from the following detailed description and the accompanying drawings.

BRIEF DESCRIPTION OF THE DRAWINGS

FIG. 4 is a flowchart for illustrating the control in the first embodiment of the present invention.

FIG. 5 is a flowchart for illustrating the control in a second embodiment of the present invention.

FIGS. 6A, 6B, 6C, 6D and 6E illustrate changes in the result of the reading by reading means when the leading edge portions of the recording materials in the transporting direction thereof in a third embodiment of the present invention have been read by the reading means.

DESCRIPTION OF THE PREFERRED EMBODIMENTS

The embodiments of the present invention will hereinafter be described with reference to the accompanying drawings.

(First Embodiment)

A first embodiment of the present invention will first be described.

Figure 1:
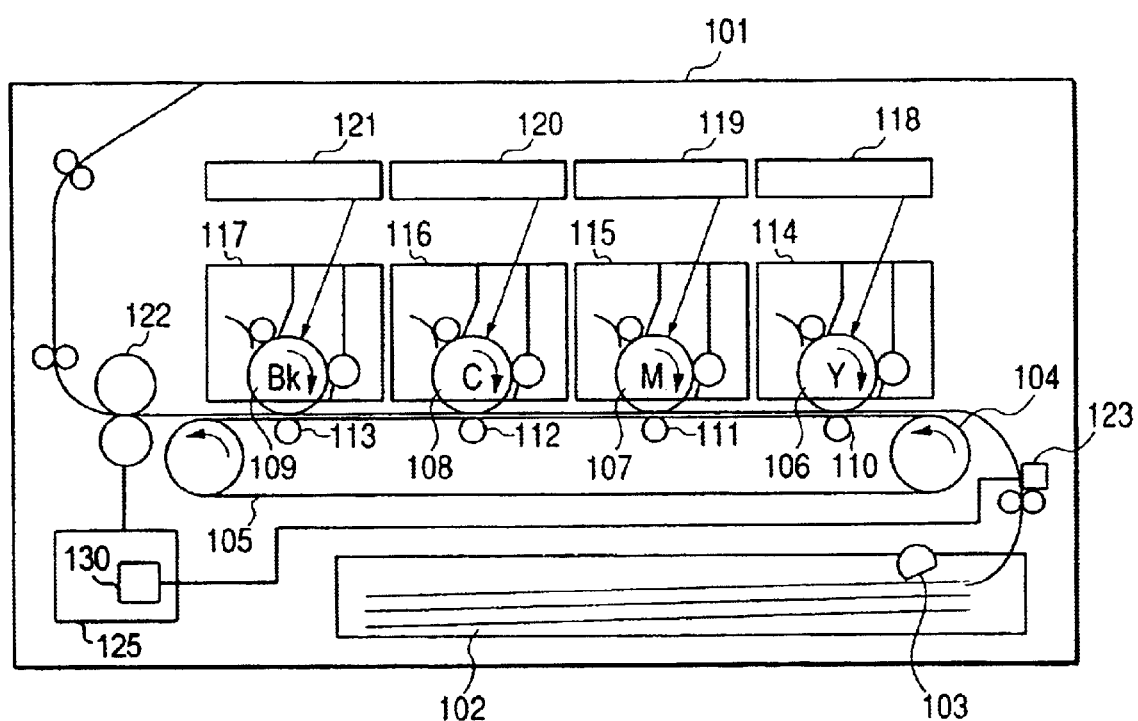
FIG. 1 is a typical cross-sectional view schematically showing the construction of an image forming apparatus according to a first embodiment of the present invention.

FIG. 1 is a typical cross-sectional view schematically showing the construction of an image forming apparatus 101 which is an example suitably showing an image forming apparatus according to the present embodiment.

The image forming apparatus 101, as shown in FIG. 1, has a sheet cassette 102, a feed roller 103, a transfer belt driving roller 104, a transfer belt 105, photosensitive drums 106, 107, 108, 109 which are latent image bearing members, transfer rollers 110, 111, 112, 113 which are transfer means, cartridges 114, 115, 116, 117, optical units 118, 119, 120, 121, a fixing unit 122 which is a fixing device, etc.

In the image forming apparatus 101, yellow, magenta, cyan and black toner images are superimposed and transferred onto a recording sheet which is a recording material by the use of the electrophotographic process, and the recording sheet is heated at a predetermined temperature and pressurized by the fixing roller (not shown) of the fixing unit 122, whereby the toner images are fixed on the recording sheet.

The optical units 118 to 121 of the respective colors are designed to expose and scan the surfaces of the respective photosensitive drums 106 to 109 by laser beams to thereby form latent images thereon, and the series of image forming operations are scanning-controlled in synchronism with one another so that the images may be transferred onto the transported recording sheet from a predetermined location thereon. The latent images formed on the surfaces of the photosensitive drums 106 to 109 are visualized as toner images by developing devices (not shown) provided in the cartridges 114 to 117 by the use of toners which are developers of the respective colors.

Also, the image forming apparatus 101 has a feed motor (not shown) for feeding and transporting the recording sheet, a transfer belt driving motor (not shown) for driving the transfer belt driving roller 104, photosensitive drum driving motors (not shown) for driving the photosensitive drums 106 to 109 and transfer rollers 110 to 113 of the respective colors, and a fixing roller driving motor (not shown) for driving the fixing roller.

Further, the image forming apparatus 101 is provided with a picture reading sensor 123 which is adapted to apply light to the surface of the recording sheet fed and transported from the sheet cassette 102 by the feed roller 103, condense and image the reflected light thereof, and detect a picture of a certain particular area of the recording sheet.

The structure of the picture reading sensor 123 will now be described with reference to FIG. 2.

Figure 2:
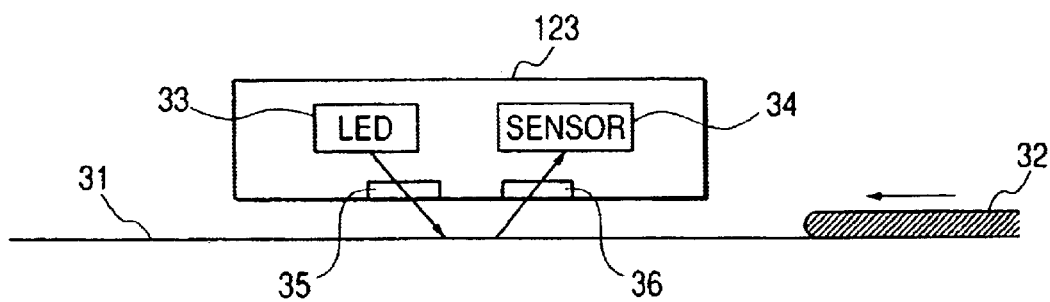
FIG. 2 schematically shows the construction of reading means provided in the image forming apparatus of FIG. 1.

The picture reading sensor 123, as shown in FIG. 2, has an LED 33 which is light applying means, a CMOS sensor 34 which is reading means, lenses 35 and 36 which are imaging lenses, etc.

Light from the LED 33 as a light source is applied to the surface of a recording sheet transporting guide 31 or the surface of the recording sheet 32 on the recording sheet transporting guide 31 through the lens 35.

Reflected light from the recording sheet 32 is condensed through the lens 36 and is imaged on the CMOS sensor 34 as light receiving means. Thereby, a picture of the surface of the recording sheet transporting guide 31 or the recording sheet 32 is read.

In the present embodiment, the LED 33 is disposed so that the LED light may be applied obliquely to the surface of the recording sheet 32 at a predetermined angle as shown in FIG. 2.

FIGS. 3A to 3F show the relations between the surfaces of recording materials read by the CMOS sensor 34 of the picture reading sensor 123 and an example in which the output from the CMOS sensor 34 has been digitally processed to 8×8 pixels.

The digital processing is effected by converting the analog output from the CMOS sensor 34 into 8-bit pixel data by an A/D converter (not shown) which is converting means.

Figure 3A:
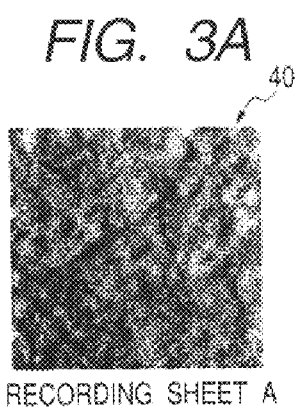
FIGS. 3A, 3B, 3C, 3D, 3E and 3F show the relations between the surfaces of recording materials read by the reading means and examples of the output from the reading means which has been digitally processed.
Figure 3B:
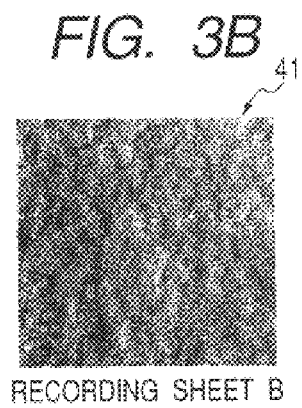
Figure 3C:
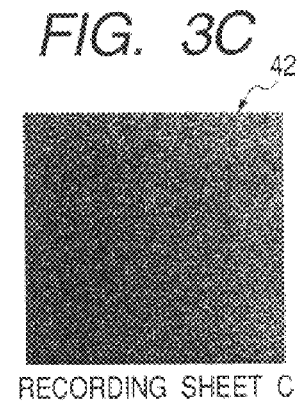

FIG. 3A shows an enlarged picture 40 of the surface of a recording sheet A which is so-called rough paper of which the surface fiber is relatively asperate, FIG. 3B shows an enlarged picture 41 of the surface of a recording sheet B which is so-called plain paper usually used, and FIG. 3C shows an enlarged picture 42 of the surface of a recording sheet C which is glossy paper of which the paper fiber is sufficiently compressed.

Figure 3D:
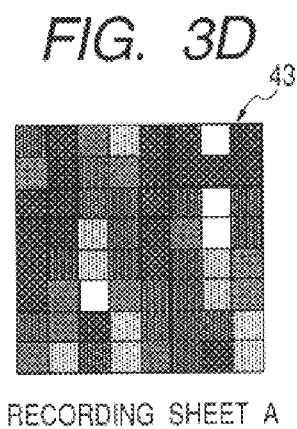
Figure 3E:
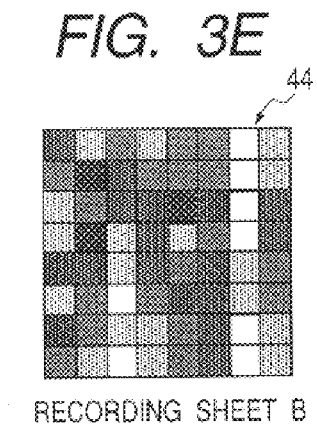
Figure 3F:
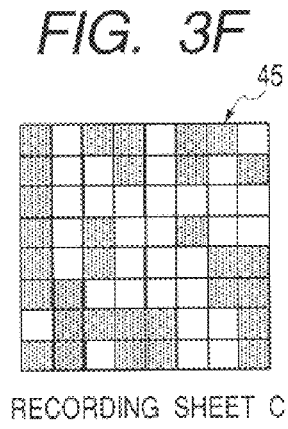

These pictures 40 to 42 read by the CMOS sensor 34 are digitally processed and become pictures 43, 44 and 45 shown in FIGS. 3D, 3E and 3F, respectively.

Like this, the pictures of the surfaces differ from one another depending on the types of the recording sheets. This is a phenomenon occurring chiefly because the state of the fiber on the surface of paper differs.

As described above, the pictures of the surfaces of the recording sheets read by the CMOS sensor 34 and digitally processed become capable of being discriminated by the surface states of the paper fibers of the recording sheets.

Reference is now had to FIG. 4 to describe the control flow by a control processor which is a fixing process condition control unit 125 provided in the image forming apparatus 101.

First, the LED 33 is lighted up (S50), and the CMOS sensor 34 reads the picture of the recording sheet (S51). The reading of the picture is effected a plurality of times on a plurality of locations on the recording sheet.

The LED 33 is then turned off (S52), thereafter constants for the gain calculation and filter calculation of gain adjusting means 130 and filter calculating means (not shown), respectively, provided in the fixing condition control unit 125 are adjusted (S53). The gain calculation and the filter calculation are programmably processed by the control processor.

For example, the gain calculation is effected by adjusting the gain of the analog output from the CMOS sensor 34. That is, the gain is adjusted when the picture of the surface of the recording sheet cannot be read well, that is, a change in the picture cannot be derived, when the quantity of reflected light reflected from the surface of the recording sheet is too great or conversely too small.

Also, the filter calculation is effected by the calculation of e.g. $\frac{1}{32}$, $\frac{1}{16}$, $\frac{1}{4}$ or the like when the analog output from the CMOS sensor 34 is A/D-converted into digital data of 8 bits and 256 graduations. That is, the noise component of the output from the CMOS sensor 34 is removed.

Then, whether sufficient picture information for effecting the next picture comparison calculation can be obtained is determined (S54), and if it is determined that sufficient picture information can be obtained, picture comparison calculation which will be described later is effected (S55), and the sheet type is determined on the basis of the result of the picture comparison calculation (S56), and a fixing temperature conforming to that sheet type is set (S57).

For example, in the case of a sheet of which the surface paper fiber is asperate like the recording sheet A shown in FIG. 3A, the fixing temperature is set to a high level, and in the case of a sheet of which the surface paper fiber is smooth like the recording sheet C shown in FIG. 3C, the fixing temperature is set to a low level and the temperature control of the fixing unit 122 is effected.

A method of the above-mentioned picture comparison calculation will be described here.

In the picture comparison calculation, a pixel Dmax of maximum density and a pixel Dmin of minimum density are derived from a result obtained by reading the pictures at a plurality of locations on the surface of the recording sheet. This is executed for each read picture and the averaging process is carried out.

That is, when the surface paper fiber is asperate like the recording sheet A, many shadows of the fiber are created. As the result, the difference between a light portion and a dark portion appears greatly and therefore, Dmax–Dmin becomes great.

On the other hand, on a surface like that of the recording sheet C, the shadows of the fiber are few and Dmax–Dmin becomes small.

By this comparison, the type of the recording sheet is determined.

It is desirable to use a digital signal processor as the control processor because the picture sampling process and the gain and filter calculation process from the CMOS sensor 34 need be effected at real time.

As described above, according to the present embodiment, the state of the surface paper fiber of the recording sheet is detected by a picture and from the result thereof, the temperature control condition of the fixing unit 122 is derived, and if the surface paper fiber of the recording sheet is asperate, the fixing temperature is made high, and if the surface paper fiber of the recording sheet is in a compressed state, the fixing temperature is made low, whereby the condition of a fixing temperature optimum for the state (roughness) of the surface of the recording sheet can always be set.

(Second Embodiment)

A second embodiment of the present invention will now be described. Members similar to those in the first embodiment are given the same reference signs and need not be described.

FIG. 5 is a flowchart for illustrating the control in the present embodiment.

In the present embodiment, as shown in FIG. 5, design is made such that the transporting speed (S67) of the recording sheet is set in conformity with the result of the sheet type determination (S66). The control at the sheet type determination (S66) is similar to that in the first embodiment.

When the transporting speed of the recording sheet is relatively low, the time during which the recording sheet passes the fixing unit 122 becomes long and the toners on the recording sheet can be sufficiently fusion-bonded. On the other hand, when the time during which the recording sheet passes the fixing unit 122 is short, the toners on the recording sheet are not sufficiently fusion-bonded.

Accordingly, for example, in the case of rough paper, the transporting speed of the recording sheet is made low to thereby sufficiently fusion-bond the toners and increase the fixing property.

In the present embodiment, the control of the transporting speed of the recording sheet is effected by controlling the rotational speeds of the feed motor, the transporting motor, the photosensitive drum driving motors, the transfer belt driving motor and the fixing motor described above.

Thus, the present embodiment is effective in a system wherein the supplied electric power to the fixing device cannot be variably controlled.

(Third Embodiment)

A third embodiment of the present invention will now be described. Members similar to those in the first embodiment are given the same reference signs and need not be described.

FIGS. 6A to 6E show the present embodiment.

The present embodiment is characterized in that in addition to the control in the first embodiment or the second embodiment, the thickness of the recording sheet is detected, and the control of the fixing temperature or the control of the transporting speed of the recording sheet is effected on the basis of the result of the detection. In the present embodiment, the structure of a picture reading sensor 70 shown in FIG. 6A is similar to that of the picture reading sensor 123 in the first embodiment, but the direction of irradiation of the LED to the recording material and the direction of detection of the CMOS sensor are opposite to those in the first embodiment.

FIGS. 6B, 6C, 6D and 6E show sampling pictures 72, 73, 74 and 75 read by the CMOS sensor of the picture reading sensor 70 and digitally processed as they are arranged in time-series.

For example, when the leading edge of the recording sheet passes the picture reading sensor 70, a picture sampled in a state in which the leading edge of the recording sheet does not yet pass the picture reading sensor 70 is Sample-1 picture 72, and a picture sampled next is Sample-2 picture 73, and the Sample-2 picture 73 shows a state in which the leading edge of the recording sheet has come to the picture reading sensor 70.

In this case, the area of the shadow of the recording sheet differs in conformity with the thickness of the recording sheet.

In the example shown in FIG. 6D, an amount 77 corresponding to two pixels is the area of a shadow proportional to the thickness of the recording sheet.

The recording sheet is being transported and therefore, as the pictures are successively sampled, the picture shifts to Sample-3 picture 74 and Sample-4 picture 75.

That is, if the picture of the leading edge of the recording sheet being transported is periodically read, the area of the shadow of the recording sheet created in proportion to the thickness of the recording sheet changes. If the length of the shadow (the number of pixels) with respect to the transporting direction of the recording sheet is found, the thickness of the recording sheet can be detected.

For example, if a reference value is stored in advance in a memory such as EEPROM, the relative thickness of the recording sheet compared with the reference value can be detected.

In this manner, the fixing temperature condition is changed for recording sheets differing in thickness, that is, control is effected with the fixing temperature increased for a recording sheet having a relatively great thickness because such recording sheet is great in heat capacity, while on the other hand, a recording sheet relatively small in thickness, i.e., small in heat capacity, is fixed with the fixing temperature lowered. Alternatively, control may be effected with the transporting speed of the recording sheet changed depending on the thickness of the recording sheet.

As described above, according to the first embodiment or the second embodiment, appropriate fixing control can be realized in conformity with the state of the surface of the recording sheet or the thickness of the recording sheet, and improvements in the fixing property and the quality of image and further, low electric powder consumption can be achieved.

Also, the reading of the picture of the surface of the recording sheet is programmably controlled by the use of an optical system which is in non-contact with the recording sheet and therefore, the flexibility of the control can be realized, and this leads to the obtainment of the effect that the downsizing of the apparatus, highly accurate control and further, highly reliable control can be realized.

While the present invention has been described above with respect to some preferred embodiments thereof, it is apparent that the present invention is not restricted to those embodiments, but various modifications and applications are possible within the scope of the invention as defined in the appended claims.

What is claimed is:

1. A detecting device comprising:
   a reading unit adapted to read a picture of a shadow of an edge of a fed sheet; and
   a detecting unit adapted to detect a thickness of the sheet on the basis of the picture read by said reading unit.

2. A detecting device according to claim 1, wherein said reading unit includes:
   an illuminating unit adapted to illuminate the sheet fed by said feeding unit; and
   a receiving unit adapted to receive a light reflected from the sheet.

3. A detecting device according to claim 2, wherein said receiving unit includes a CMOS sensor.

4. A detecting device comprising:
   a reading unit adapted to read a picture of a surface of a feeding sheet;
   a discriminating unit adapted to discriminate whether a rereading is necessary on the basis of the picture read by said reading unit;
   a unit adapted to change a reading condition of said reading unit and to cause said reading unit to reread a picture of a surface of the sheet, on the basis of a fact that it has been discriminated by said discriminating unit that the rereading is necessary; and
   a detecting unit adapted to detect a type of the sheet on the basis of the picture read by said reading unit.

5. A detecting device according to claim 4, wherein said detecting unit detects that the sheet is plain paper.

6. A detecting device according to claim 4, wherein said detecting unit detects that the sheet is rough paper.

7. A detecting device according to claim 4, wherein said detecting unit detects that the sheet is glossy paper.

8. A detecting device according to claim 4, wherein said reading unit includes:
   an illuminating unit adapted to illuminate the sheet;
   a light receiving unit adapted to receive a light from said illuminating unit reflected back from the sheet; and
   a converting unit adapted to digitize an output of said light receiving unit.

9. A detecting device according to claim 8, wherein said light receiving unit includes a CMOS sensor.

10. A detecting device according to claim 8, wherein said unit adapted to cause said reading unit to reread the picture changes a gain of said converting unit.

11. A detecting device according to claim 8, wherein said reading unit includes a calculating unit adapted to filter-calculate an output from said converting unit, and said unit adapted to cause said reading unit to reread the picture changes calculation parameters of said calculating unit.

12. An image forming apparatus comprising:
   a feeding unit adapted to feed a sheet;
   an image forming unit adapted to form an image on the sheet fed by said feeding unit;
   a reading unit adapted to read a picture of a shadow of an edge of the sheet fed by said feeding unit;
   a detecting unit adapted to detect a thickness of the sheet on the basis of the picture read by said reading unit; and
   a controlling unit adapted to control an image forming condition of said image forming unit on the basis of a result of detection.

13. An image forming apparatus according to claim 12, wherein said reading unit includes:
   an illuminating unit adapted to illuminate the sheet fed by said feeding unit; and
   a receiving unit adapted to receive a light reflected from the sheet.

14. An image forming apparatus according to claim 13, wherein said receiving unit includes a CMOS sensor.

15. An image forming apparatus according to claim 12, wherein said image forming unit includes:
   a transferring unit adapted to transfer a toner image to the sheet; and
   a fixing unit adapted to fix the toner image transferred by said transferring unit on the sheet, and
   wherein said controlling unit controls a fixing condition of said fixing unit.

16. An image forming apparatus according to claim 15, wherein said controlling unit controls a fixing temperature of said fixing unit.

17. An image forming apparatus according to claim 15, wherein said controlling unit controls a fixing speed of said fixing unit.

18. An image forming apparatus comprising:

a feeding unit adapted to feed a sheet;

an image forming unit adapted to form an image on the sheet fed by said feeding unit;

a reading unit adapted to read a picture of a surface of the sheet fed by said feeding unit;

a discriminating unit adapted to discriminate whether a rereading is necessary on the basis of the picture read by said reading unit;

a unit adapted to change a reading condition of said reading unit and to cause said reading unit to reread a picture of a surface of the sheet, on the basis of a fact that it has been discriminated by said discriminating unit that the rereading is necessary;

a detecting unit adapted to detect a type of the sheet on the basis of the picture read by said reading unit; and a controlling unit adapted to control an image forming condition of said image forming unit on the basis of a result of detection by said detecting unit.

19. An image forming apparatus according to claim 18, wherein said detecting unit detects that the sheet is plain paper.

20. An image forming apparatus according to claim 18, wherein said detecting unit detects that the sheet is rough paper.

21. An image forming apparatus according to claim 18, wherein said detecting unit detects that the sheet is glossy paper.

22. An image forming apparatus according to claim 18, wherein said reading unit includes:

an illuminating unit adapted to illuminate the sheet;

a light receiving unit adapted to receive a light from said illuminating unit reflected back from the sheet; and a converting unit adapted to digitize an output of said light receiving unit.

23. An image forming apparatus according to claim 22, wherein said light receiving unit includes a CMOS sensor.

24. An image forming apparatus according to claim 22, wherein said unit adapted to cause said reading unit to reread the picture changes a gain of said converting unit.

25. An image forming apparatus according to claim 22, wherein said reading unit includes a calculating unit adapted to filter-calculate an output from said converting, and said unit adapted to cause said reading unit to reread the picture changes calculation parameters of said calculating unit.

26. An image forming apparatus according to claim 18, wherein said image forming unit includes:

a transferring unit adapted to fix a toner image to the sheet; and a fixing unit adapted to fix the toner image transferred by said transferring unit on the sheet, and wherein said controlling unit controls a fixing condition of said fixing unit.

27. An image forming apparatus according to claim 26, wherein said controlling unit controls a fixing temperature of said fixing unit.

28. An image forming apparatus according to claim 26, wherein said controlling unit controls a fixing speed of said fixing unit.

* * * * *

UNITED STATES PATENT AND TRADEMARK OFFICE
CERTIFICATE OF CORRECTION

PATENT NO. : 6,668,144 B2
DATED : December 23, 2003
INVENTOR(S) : Shoji Maruyama It is certified that error appears in the above-identified patent and that said Letters Patent is hereby corrected as shown below:

Column 1,
Line 51, "a" should be deleted.

Column 3,
Line 28, "has" should read -- have --.

Column 7,
Line 38, "powder" should read -- power --.

Column 10,
Line 14, "converting," should read -- converting unit, --.
Line 20, "fix" should read -- transfer --.

Signed and Sealed this

Twenty-fifth Day of May, 2004

JON W. DUDAS
*Acting Director of the United States Patent and Trademark Office*